(12) United States Patent
Hsiao et al.

(10) Patent No.: US 11,882,121 B2
(45) Date of Patent: Jan. 23, 2024

(54) METHOD AND SYSTEM FOR PACKET PROCESSING ACCORDING TO ACCESS CONTROL LIST TABLE

(71) Applicant: OPTICORE TECHNOLOGIES, INC., Irvine, CA (US)

(72) Inventors: Yi-Lung Hsiao, Taipei (TW); Chih-Liang Chou, Taipei (TW)

(73) Assignee: OPTICORE TECHNOLOGIES, INC., Wilmington, DE (US)

( * ) Notice: Subject to any disclaimer, the term of this patent is extended or adjusted under 35 U.S.C. 154(b) by 251 days.

(21) Appl. No.: 17/380,012

(22) Filed: Jul. 20, 2021

(65) Prior Publication Data

US 2022/0021679 A1  Jan. 20, 2022

Related U.S. Application Data

(60) Provisional application No. 63/054,210, filed on Jul. 20, 2020.

(51) Int. Cl.
  *H04L 9/40* (2022.01)
  *G06F 16/22* (2019.01)
  *G06F 21/64* (2013.01)

(52) U.S. Cl.
  CPC ........ *H04L 63/101* (2013.01); *G06F 16/2255* (2019.01); *G06F 21/64* (2013.01); *H04L 63/0245* (2013.01)

(58) Field of Classification Search
  CPC . H04L 63/101; H04L 63/0245; H04L 9/0643; H04L 63/12; H04L 45/7453;
  (Continued)

(56) References Cited

U.S. PATENT DOCUMENTS

2020/0389469 A1* 12/2020 Litichever ............... H04W 4/40

OTHER PUBLICATIONS

TIPO, first non final office action.
CNIPA, first non final office action.

* cited by examiner

*Primary Examiner* — Michael Simitoski
*Assistant Examiner* — Andrew Suh
(74) *Attorney, Agent, or Firm* — The Marbury Law Group/Qualcomm (57) ABSTRACT

The present invention provides a method for packet processing according to a access control list table, comprising: receiving a packet, wherein the packet includes a packet information and match items for matching; providing an access control list (ACL) codeword table; providing a mask table, wherein the ACL codeword table corresponds to the mask table; obtaining a hash key by performing a multiplexing logic operation, wherein the hash key is made by combining a multiplex result of the packet information and the mask table; obtaining a hash value by performing a hash function based on the hash key, wherein the hash value is composed of X+Y, wherein X is a signature table (hash table) index and Y is a key digest; performing a hash table indexing, based on the signature table index, wherein the signature table index is the index to an address of signature table; performing a fast pattern match, wherein the signature table contains signature fields, and if any second signature field in the signature table is matched with the digest key, the action table index of the same signature field is then assigned to an address index to an action table; and applying an action to the packet, wherein the action is listed in the action table.

14 Claims, 8 Drawing Sheets

(58) Field of Classification Search
CPC .............. H04L 1/0061; H04L 12/4641; G06F 16/2255; G06F 21/64
See application file for complete search history.

Mask Table

| Table Address | Type | L2 DA | L2 SA | VLAN TPID | VLAN Pri. | VLAN DE Bit | VLAN ID |
|---|---|---|---|---|---|---|---|
| 0 | 0 | 0 | 48 | 0 | 0 | 0 | 12 |

| Table Address | Type | Port No. | Ether Type | IPv4 Dest. Add. | IPv4 Src. Add. | IPv4 TOS | IPv4 IGMP |
|---|---|---|---|---|---|---|---|
| 14 | 1 | 0 | 1 | 24 | 0 | 0 | 0 |
| 31 | | | | | | | |

METHOD AND SYSTEM FOR PACKET PROCESSING ACCORDING TO ACCESS CONTROL LIST TABLE

CROSS REFERENCE TO RELATED APPLICATION

The present application claims priority to U.S. Provisional Application Ser. No. 63/054,210, filed on Jul. 20, 2020, which are hereby incorporated by reference in their entirety.

FIELD

The present invention relates to a method and system for packet processing according to a table lookup and, more particularly, to a method and system for packet processing according to fast access control list table lookup with fast pattern match.

BACKGROUND

In computer security, an access-control list (ACL) is a list of permissions associated with a system resource (or object). An ACL specifies which users or system processes are granted access to objects, as well as what operations are allowed on given objects. Each entry in a typical ACL specifies a subject and an operation. For instance, if a file object has an ACL that contains, for example, Alice: read, write; Bob: read, this would give Alice permission to read and write the file and only give Bob permission to read it.

However, traditional ACL related technologies require an expensive Ternary Content Addressable Memory (TCAM) for fast entry lookup. If no TCAM is used, typically the ACL in the form of a list of the groups that associated with the lookup data key and takes a long latency to find the matched data entry.

Further, some other disadvantages are that it takes a long time to search the table, the lookup time increased with a multi-field information search, and it is hard to locate the rule index address with in one cycle.

SUMMARY OF THE DISCLOSURE

The present invention relates to a method and system for fast access control list table lookup and, more particular, to a method and system for fast access control list table lookup with fast pattern match.

According to present invention, a method for packet processing according to a access control list table is provided. The method comprises: receiving a packet, wherein the packet includes a packet information and match items for matching; providing an access control list (ACL) codeword table; providing a mask table, wherein the ACL codeword table corresponds to the mask table; obtaining a hash key by performing a multiplexing logic operation, wherein the hash key is made by combining a multiplex result of the packet information and the mask table; obtaining a hash value by performing a hash function based on the hash key, wherein the hash value is composed of X+Y, wherein X is a signature table (hash table) index and Y is a key digest; performing a hash table indexing, based on the signature table index, wherein the signature table index is the index to an address of signature table; performing a fast pattern match, wherein the signature table contains signature fields, and if any second signature field in the signature table is matched with the digest key, the action table index of the same signature field is then assigned to an address index to an action table; and applying an action to the packet, wherein the action is listed in the action table.

Preferably, the ACL codeword table and the mask table is stored in a memory.

Preferably, the action includes forwarding action, VLAN tagging operation, DSCP/ToS modification action, or statistics or metering action.

Preferably, the ACL codeword table includes a mask table index, a cascade field and a last field.

Preferably, the hash value generation is performed based on a cyclic redundancy check (CRC) algorithm or any hash algorithm.

Preferably, the hash value comparison is performed by a hash table index and key digest.

Preferably, the signature table index is index to the signature table and use the key digest to match the second signature field.

According to present invention, a system for packet processing according to an access control list table is provided. The system comprises: a switch, configured to receive a packet, wherein the packet includes a packet information and match items for matching; a memory, storing an access control list (ACL) codeword table and a mask table, wherein the ACL codeword table corresponds to the mask table; a multiplex logic, configured to perform a multiplexing logic operation to obtain a hash key, wherein the hash key is made by combining a multiplex result of the packet information and the mask table, wherein a hash function is then performed based on the hash key to obtain a hash value, wherein the hash value is composed of X+Y, wherein X is a signature table (hash table) index and Y is a key digest; a processor, configured to perform a hash table indexing, based on the signature table index, wherein the signature table index is the index to an address of signature table; wherein the processor performs a fast pattern match, wherein the signature table contains signature fields, and if any second signature field in the signature table is matched with the digest key, the action table index of the same signature field is then assigned to an address index to an action table; and wherein the processor performs an action to the packet, wherein the action is listed in the action table.

Preferably, the ACL codeword table and the mask table is stored in a memory.

Preferably, the action includes forwarding action, VLAN tagging operation, DSCP/ToS modification action, or statistics or metering action.

Preferably, the ACL codeword table includes a mask table index, a cascade field and a last field.

Preferably, the hash value generation is performed based on a cyclic redundancy check (CRC) algorithm or any hash algorithm.

Preferably, the hash value comparison is performed by a hash table index and key digest.

Preferably, the signature table index is index to the signature table and use the key digest to match the second signature field.

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to the present invention, an ACL (access control list) table with fast pattern match methodology is defined. The ACL table includes a codeword table, a protocol mask table, a signature table and an action table, and the purpose is to reduce ACL table lookup latency, especially for multi rules table search.

By using a codeword table and a mask table to generate a hash key to point to the corresponding entry in the ACL signature and action table, thus to reduce the table search time and hardware process latency.

Detailed descriptions with respect to each table will be described in advance before getting into detailed descriptions of the embodiments of the present invention.

Codeword Index Table

Figure 1:
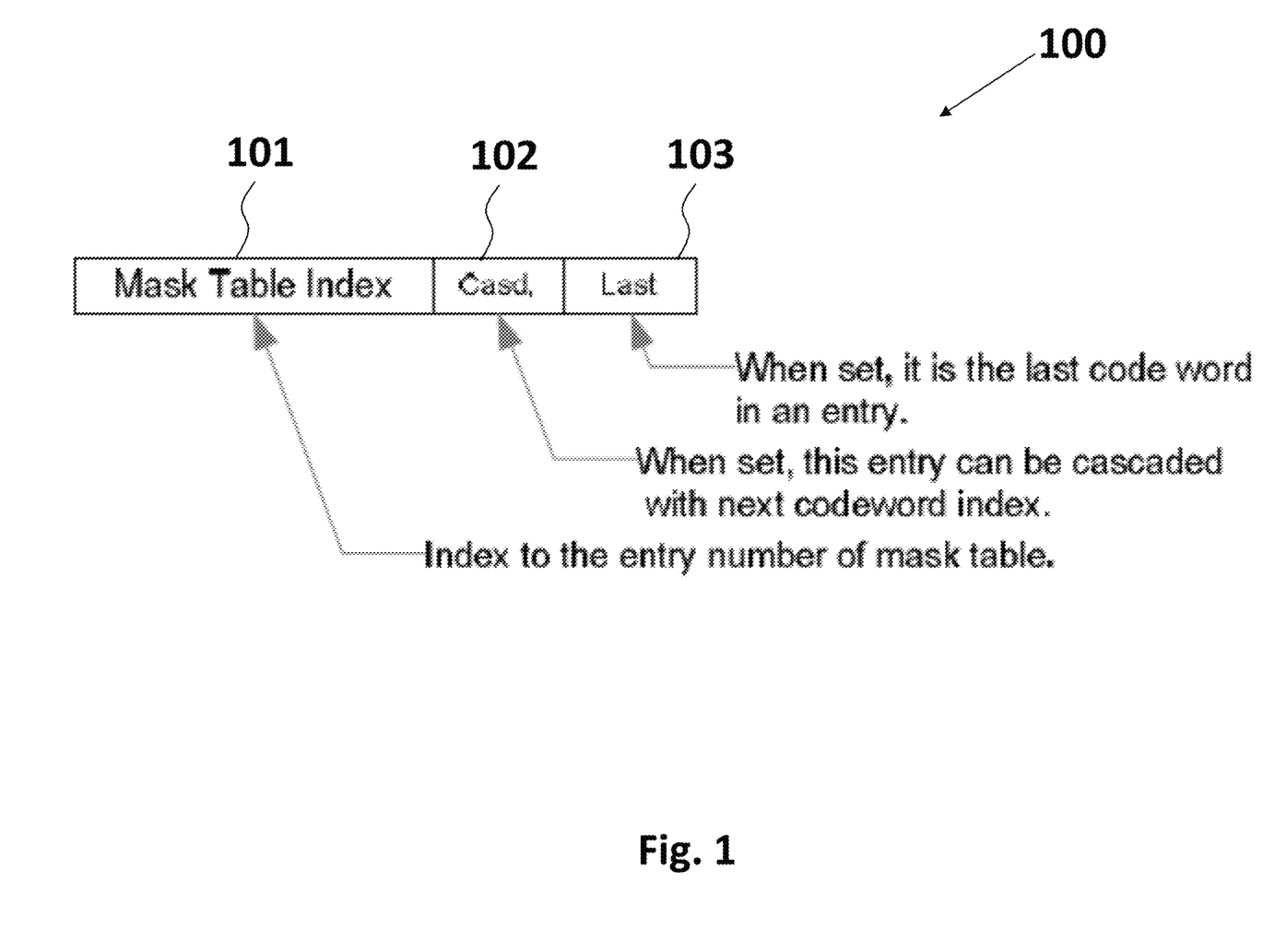
FIG. 1 illustrates a codeword index table according to an embodiment of the present invention.

Reference is firstly made to FIG. 1, which illustrates a codeword index table according to an embodiment of the present invention.

As can be seen in FIG. 1, a codeword index table 100 includes some codeword index fields. In the present embodiment, the codeword index table has a mask table index 101, a Casd. field 102, and a Last filed 103. For mask table index 101, it index to the entry number of mask table. And for Casd. field 102 (cascade field), such entry can be cascaded with the next codeword index when it is set. Further, for Last field 103, it is the last code word in an entry when set.

Mask Table

Figure 2:
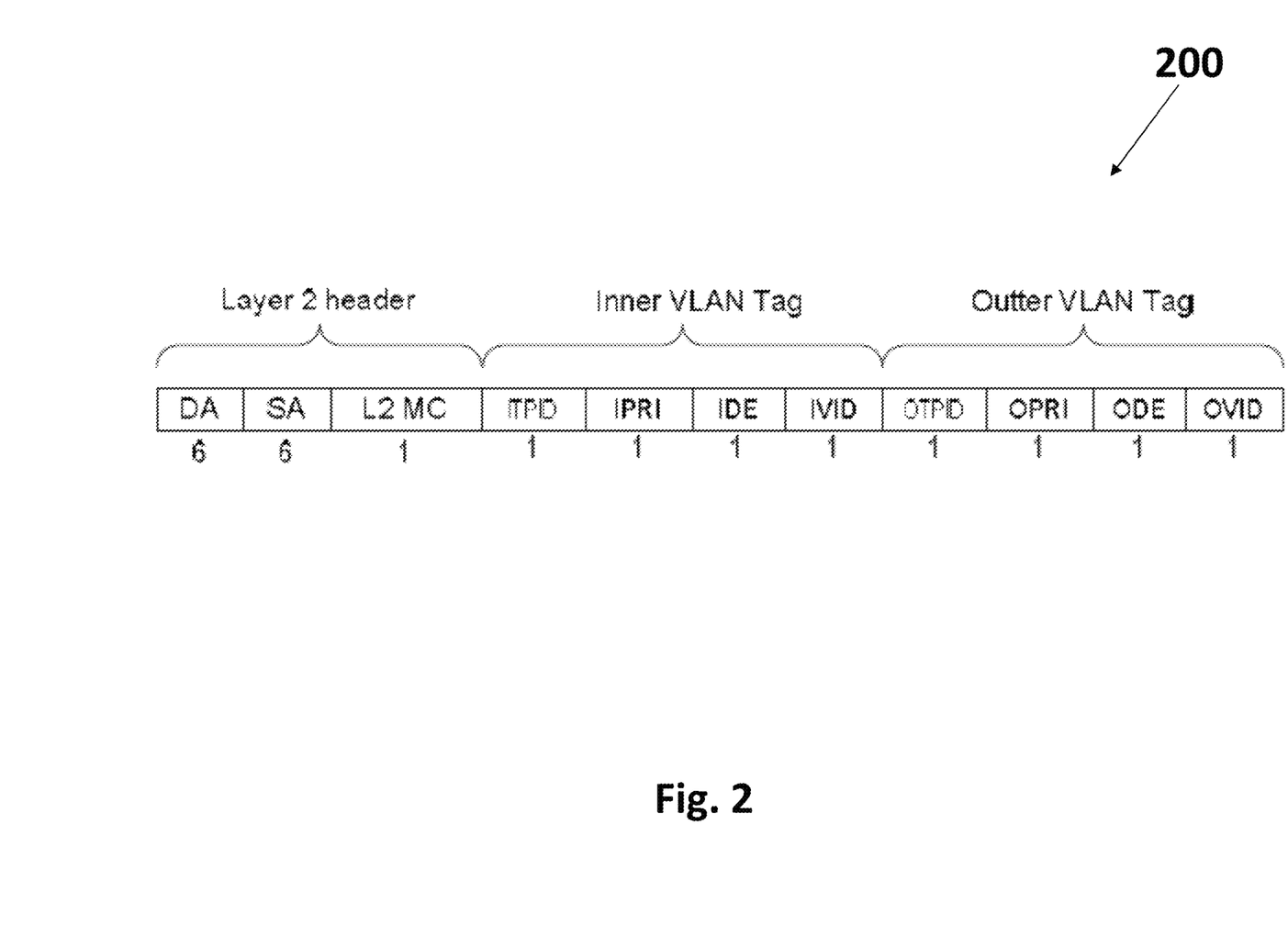
FIG. 2 illustrates a mask table 200 according to an embodiment of the present invention.

Reference is next made to FIG. 2, which illustrates a mask table 200 according to an embodiment of the present invention. As shown in FIG. 2, mask table 200 contained some mask entries, which points out the "need to care" fields for generating hash key.

Comparing with traditional ACL filtering table, only few bits is used to present the "need to care" or "don't care" in the present invention, instead of the full range of bits.

For example, regarding DA (layer 2 MAC Destination Address), it is a 48-bit field. However, in the present invention, only 6 bit is used to present how many bits should be taken care (a bit mask concept). Accordingly, filter space is reduced from 48 bits to 6 bits.

Further, for IVID (Inner VLAN ID), conventionally it is represented in 12 bits. Wherein it is transformed to 1 bit only mask.

In conceptual, the contents of mask table is construed as to filter any field of an incoming Ethernet packet. The thing needs to concern is the bit width of the mask table. Therefore, an "entry cascade" feature is introduced, this bit located in the codeword index. If set, the next entry in the codeword index table will be considered to generate the hash key. Each entry can filter different protocol field.

Hash Value

Regarding the hash value, there are many ways to devise algorithms to compute hash table index and key digest. CRC (cyclic redundancy check) algorithm is one of them.

For a well-designed N-bit CRC algorithm, it can take an original bit sequence of L bits and produce an N-bit checksum. With the N-bit checksum, it can be divided into two parts, the first signature address index (X, hash table index) and the second signature value (Y, key digest).

Signature address index (X) is used as the address index and points to the signature table, and the signature value (Y) is put in the ACL signature table which play the function of fast match.

Signature Table

Figure 3:
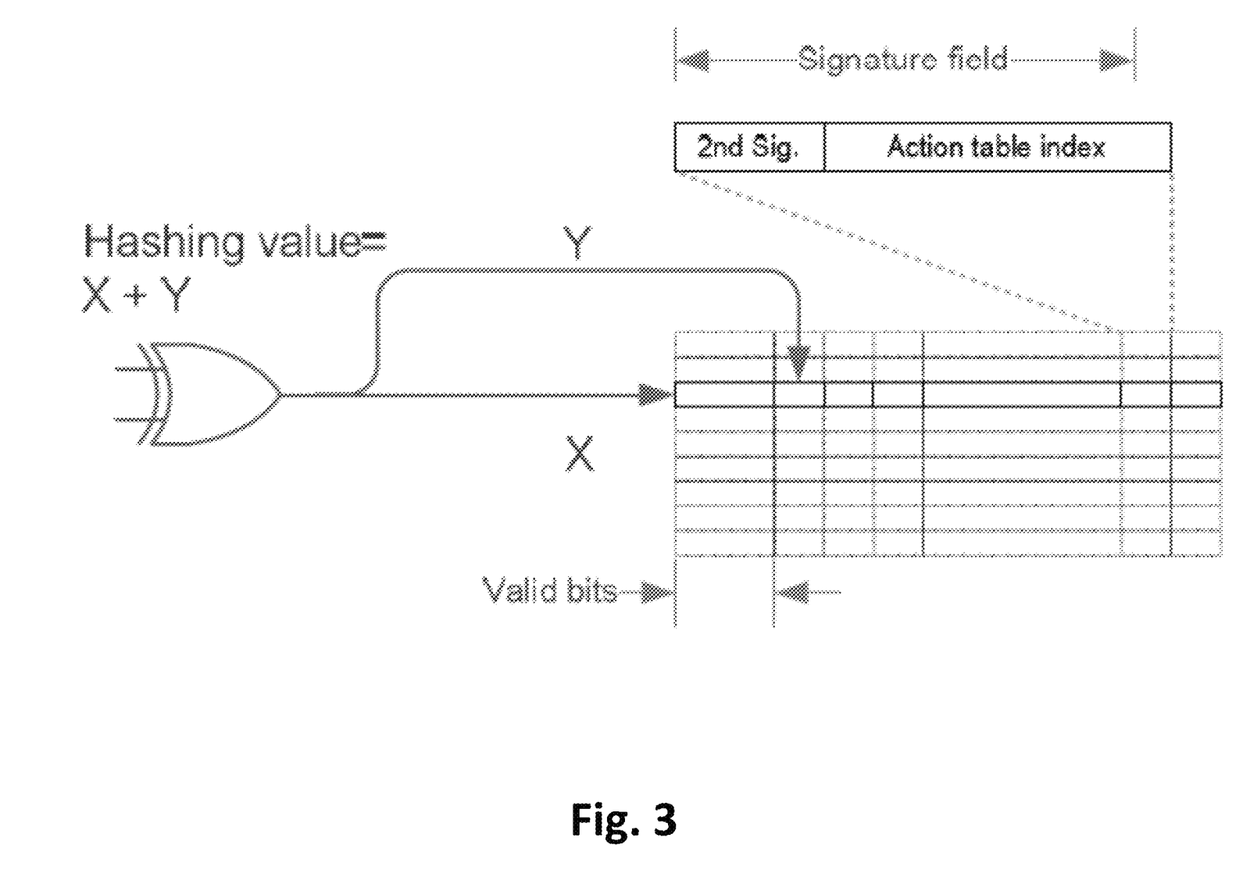
FIG. 3 illustrates a signature table according an embodiment of the present invention.

Reference is next made to FIG. 3, which illustrates a signature table according an embodiment of the present invention.

A signature table is used for fast pattern match for the hash value comparison. The N-bit checksum can be defined as a (X+Y) bits of checksum. The X is used as the hash table index points to the signature table. Y is the signature value put in the signature table entry for fast pattern match. The valid bits field is to identify how many signature fields are valid. Further as shown in FIG. 3, the hash value generation is performed by a cyclic redundancy check (CRC) algorithm.

One single row of the signature table contains some signature fields. Usually this table is composed by memory, after read an entry of a row, the hardware can compare the hashing index Y and the value in the second signature field in a parallel fashion. Once the Y value is hit with a second signature value, and the action table index is then used to get the action rule. The signature table to action table can be one-to-one or many-to-one mapping.

Action Table

Regarding the action table, action table entry is constructed by some action code categories of actions that can be applied to matched packet. The action code categories can be, such as, (1) Forwarding actions, further including extraction, mirroring, redirecting, pass-through and remarking; (2) VLAN tagging operation, further including modify/delete/insert the VLAN field; (3) DSCP/ToS modification action, further including modify DSCP (Differentiated Services Code Point) or ToS value of the matched packet; and (4) Statistics or metering action and, for statistics: accumulate the packet number or sum of packet length of the matched packet, and for metering: discard the rule matched packet, if the packet length amount exceed a predefined value.

Figure 4:
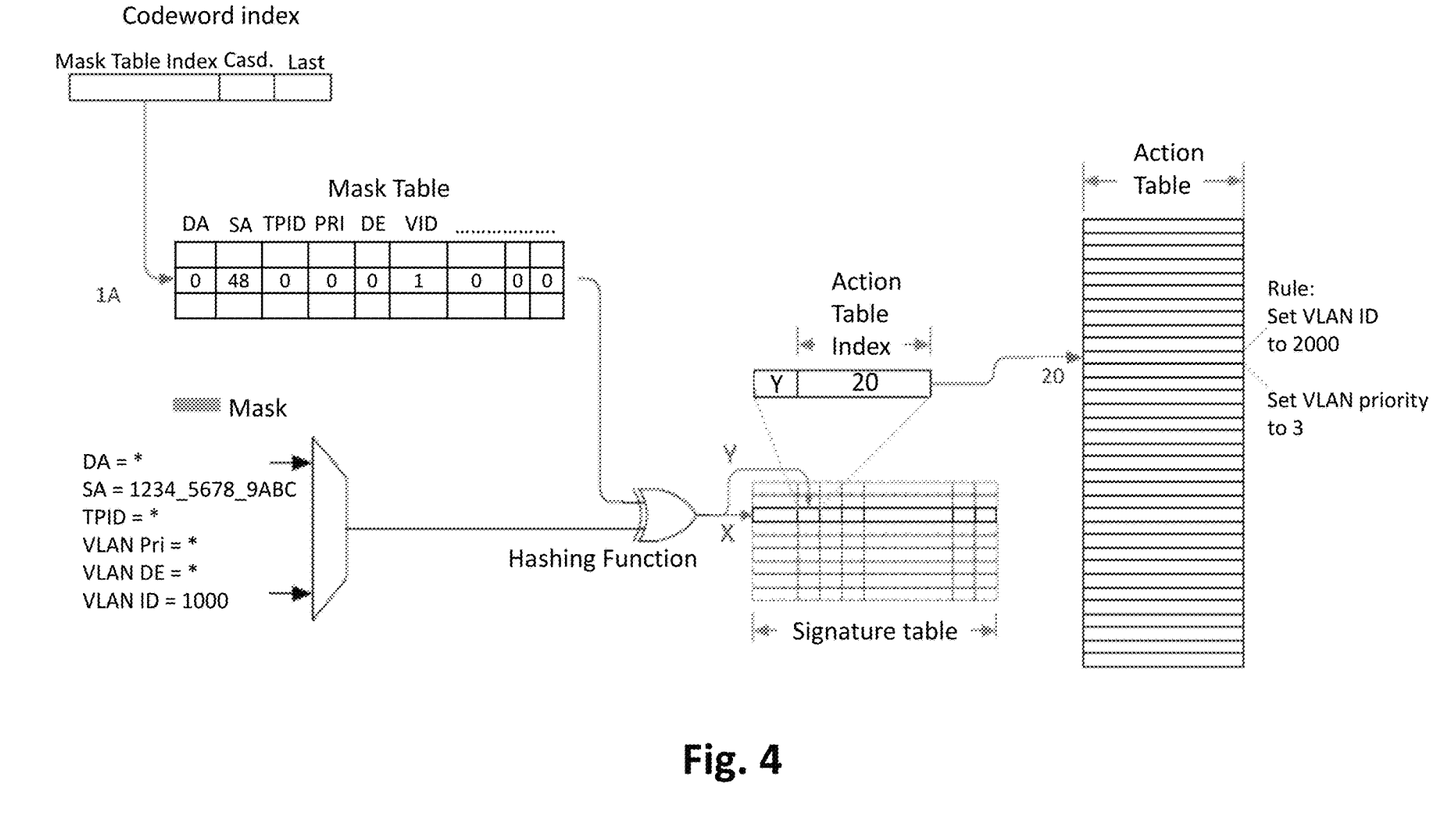
FIG. 4 illustrates a first exemplary embodiment of the present invention.

Reference is next made to FIG. 4, which illustrates a first exemplary embodiment of the present invention. It is to be construed in the embodiment that, a packet is received by a switch, and a parser (not shown in the figure) is used to parse certain information out of the packet for matching (or match items). In the present embodiment, the match items (to be matched items) are: (1) SA: 1234_5678_9ABC; (2) VLAN priority: any (also known as don't care, which means no matter what the value coming is, the match is always true); and (c) VLAN ID: 1000. Wherein SA stands for source address. While the actions (what kind of action is taken to process a packet, for match items that hit) of the present embodiment are (1): change VLAN ID from 1000 to 200; and (2) change VLAN priority from any to 3.

When a packet (for example, an Ethernet packet) comes in (for example, a packet comes into a switch), the ACL engine reads the codeword index in the sequence, also known as codeword index setting. As shown in FIG. 4, the codeword index is '1A', then the mask information from '1A' of the mask table is fetched.

With the mask table data, the SA (source MAC address) and VLAN ID should be taken care of and the rest packet information is ignored. After masking the incoming packet information, the hash key via a hashing algorithm is generated.

The hash value is divided into two parts—a signature table index (X) and a second signature value (Y), as described in the previous paragraph. The value Y is pre-programmed to the signature table. If the second signature matches with the Y part of the hashing key, then the action table index of the same signature field is the address index to the action table. Here, the action table index is 20.

The value 20 is then used as the address to fetch the action rule table. The action rule will be, change VLAN ID to 200 and change VLAN priority to 3. Further, a packet egress logic use the action rule to modify the contents of the pattern matched packet.

A second exemplary embodiment is also presented in the present invention. A packet comes in as well, and a parser is used to fetch certain information for matching (or match items). In the present second embodiment, the match items are: (1) SA (source address): 8'h0123_4567_89AB; (2) VLAN priority: any (don't care); (3) VLAN ID: 12'h100; and (4) IPv4 Dest. IP Add.: 32'hAAAA_BBXX. Wherein the XX in 32'hAAAA_BBXX means don't care. The representation of each match item is well known to people with ordinary skill in the art, and therefore relevant descriptions will be omitted for convenience.

Further in the present second embodiment, the actions (for match items that hit) of are (1): Change TPID to 16'h88A8; and (2) Change VLAN ID from 12'h100 to 12'h200.

Figure 5:
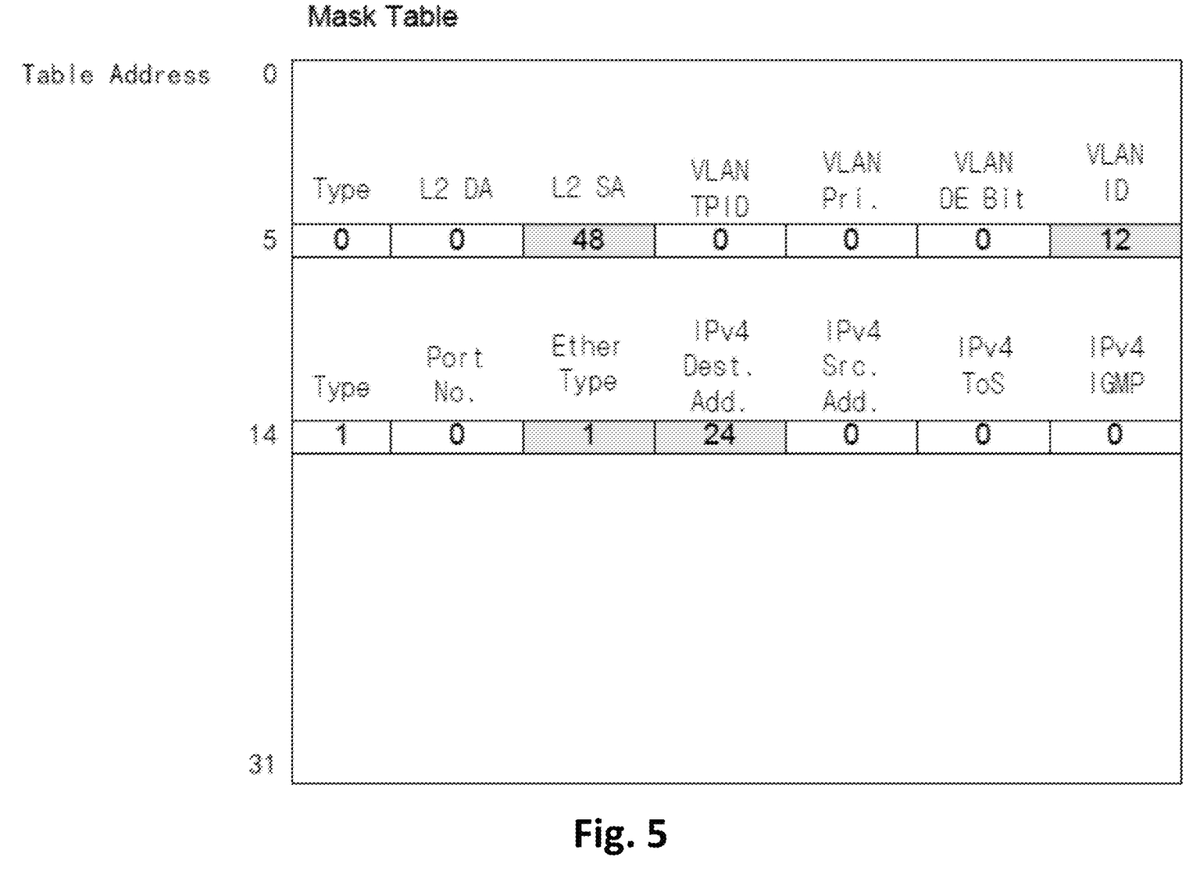
FIG. 5 illustrates the mask table for the second embodiment.

In the present embodiment, FIG. 5 is collectively referred to, where FIG. 5 illustrates the mask table for the second embodiment.

The ACL mask is then defined. Due to memory width limitation, the ACL mask entry has different types. Further, the system application defines and fill the mask table by filtering requirement. Moreover, it is not necessary to fill the table by sequence (start from address 0 and then 1, 2, 3 . . . ).

Figure 6:
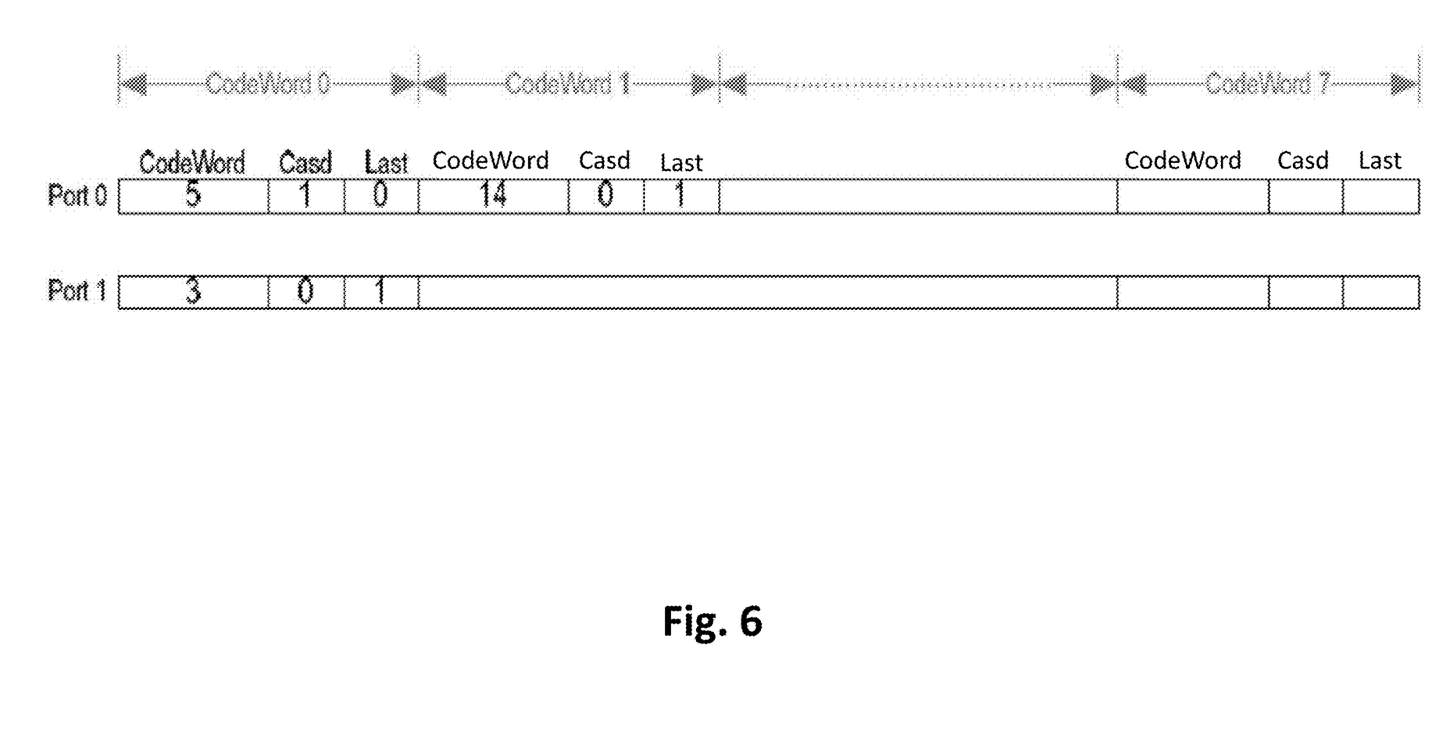
FIG. 6 illustrates the codeword table of the second embodiment.

Next, the codeword table is defined, as shown in FIG. 6, which illustrates the codeword table of the second embodiment. In FIG. 6, each port (in the present embodiment, two ports are illustrates, port 0 and port 1) has some code word entries and it put in one or memory row. Further, the index from code word index to mask table can be "1 to 1" or "many to 1". Also, the cascade flag means two adjacent entry can cascade to form a large mask, and a codeword with a last flag is set, meaning it is the last code word entry in the code word row.

Figure 7:
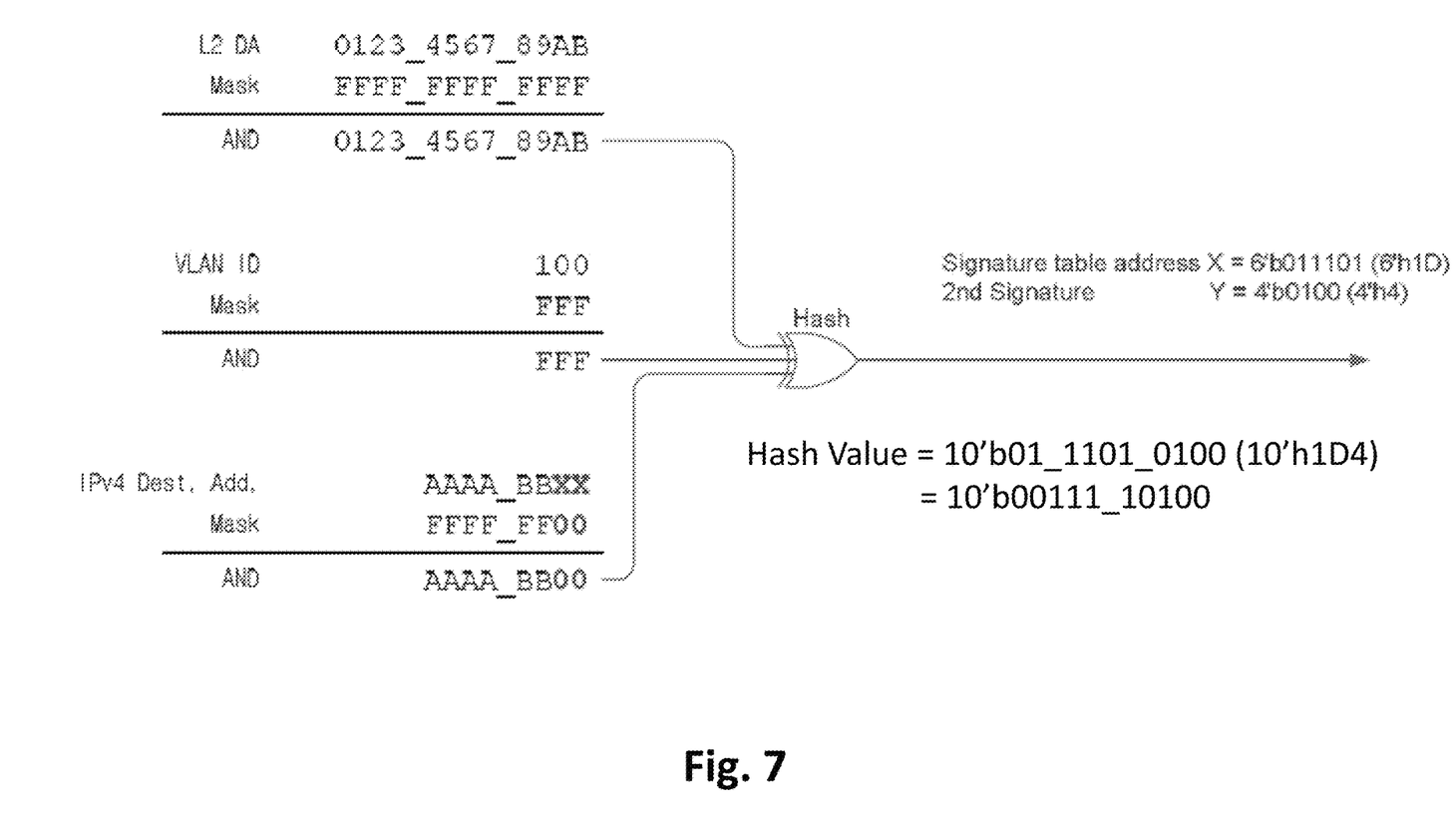
FIG. 7 illustrates the hash value calculation according to the second embodiment.

Reference is collective made to FIG. 7, which illustrates the hash value calculation according to the second embodiment.

As shown in FIG. 7, the system application uses SA (48'h1234_5678_9ABC), VID (12'h100) and IPv4 Destination IP Address (32'hAAAA_BBXX) to generate a hashing key by hash algorithm. Further, the hash value generation is performed by a hash algorithm. The IPv4 Destination Address range is not fully compared, it uses a mask to ignore the last byte, and therefore, the mask value of the last byte is '00'.

The hash value can composed by X+Y, where X is the first signature, used as the signature table address index, and Y is the second signature, used for fast pattern match.

Figure 8:
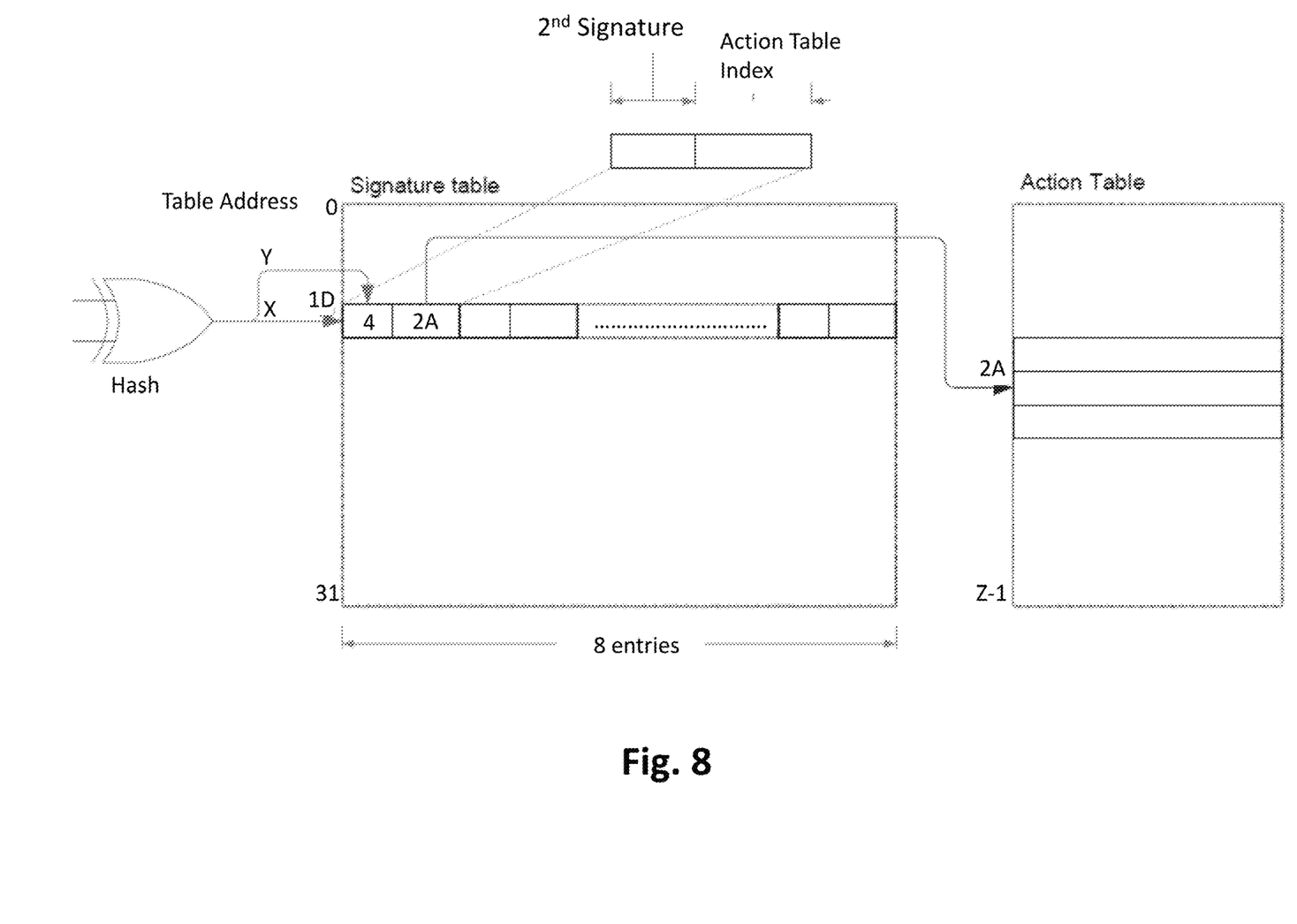
FIG. 8 illustrates the signature table for the second embodiment.

Reference is also collectively made to FIG. 8, which illustrates the signature table for the second embodiment.

It should be noted that, each memory row of the signature table contained several signature entries. This is for reducing the chance of hashing collision phenomena. Further, when a memory row is read out, the second signature (from hashing value) is used for a fast pattern match.

Moreover, the signature index composed by two fields, (1) second signature, it's the Y part of the hashing value; and (2) action table index, the action table memory address index, points to the action rule.

Regarding the action table, the action table address index comes from the signature table after the second signature comparison is matched. It should be noted that one action rule can composed by one or more memory row. The action rule may has the following rules: (1) drop packet; (2) force forwarding (forward to a specific port); (3) packet mirroring; (4) packet content modification; and (5) etc.

In the present second embodiment, the actions are: (1) change the VLAN TPID to 16'h88A8; and (2) change VLAN ID from 12'h100 to 12'h200. Therefore, these two actions are taken on the packet.

In sum, the present invention defines an ACL table with fast pattern match. Further such ACL table includes codeword table, protocol mask table, signature table and action table.

In sum, one of the purposes of the present invention is to reduce the ACL table lookup latency, especially for multi rules table search.

In sum, the present invention may be applied in variant environments, such as all sorts of communication and networking application, all sorts of networking equipment and all kinds of embedded applications.

In sum, by using a codeword table and a mask table to generate a hash key to point to the corresponding entry in the ACL Signature and Action table, thus to reduce the table search time and hardware process latency.

In sum, the system application can define the codeword index and share the same codeword index with different port to reduce the table usage.

In sum, according to the present invention, the hashing value is determined within a short time, so as the lookup latency may be reduced.

In sum, the system application can arrange the rule order and put the high frequency using rules in the front of rule table slot, by requirement.

The invention claimed is:

1. A method for packet processing according to an access control list table, comprising:

receiving a packet, wherein the packet includes a packet information and match items for matching;

providing an access control list (ACL) codeword table;

providing a mask table, wherein the ACL codeword table corresponds to the mask table;

obtaining a hash key by performing a multiplexing logic operation, wherein the hash key is made by combining a multiplex result of the packet information and the mask table;

obtaining a hash value by performing a hash function based on the hash key, wherein the hash value is composed of X+Y, wherein X is a signature table (hash table) index and Y is a key digest;

performing a hash table indexing, based on the signature table index, wherein the signature table index is an index to an address of signature table;

performing a fast pattern match, wherein the signature table contains signature fields, and in response to any second signature field in the signature table being matched with the key digest, an action table index of the same signature field is then assigned to an address index to an action table; and applying an action to the packet, wherein the action is listed in the action table.

2. The method for packet processing according to an access control list table according to claim 1, wherein the ACL codeword table and the mask table are stored in a memory.

3. The method for packet processing according to an access control list table according to claim 1, wherein the action includes forwarding action, virtual local area network (ULAN) tagging operation, differentiated services code point/type of service (DSCP/ToS) modification action, or statistics or metering action.

4. The method for packet processing according to an access control list table according to claim 1, wherein the ACL codeword table includes a mask table index, a cascade field and a last field.

5. The method for packet processing according to an access control list table according to claim 1, wherein the obtaining the hash value is performed based on a cyclic redundancy check (CRC) algorithm or any hash algorithm.

6. The method for packet processing according to an access control list table according to claim 1, wherein a hash value comparison is performed by the hash table index and the key digest.

7. The method for fast pattern matching according to claim 1, wherein the signature table index is an index to the signature table and uses the key digest to match the second signature field.

8. A system for packet processing according to an access control list table, comprising:

a switch, configured to receive a packet, wherein the packet includes a packet information and match items for matching;

a memory, storing an access control list (ACL) codeword table and a mask table, wherein the ACL codeword table corresponds to the mask table;

a multiplex logic, configured to perform a multiplexing logic operation to obtain a hash key, wherein the hash key is made by combining a multiplex result of the packet information and the mask table, wherein a hash function is then performed based on the hash key to obtain a hash value, wherein the hash value is composed of X+Y, wherein X is a signature table (hash table) index and Y is a key digest;

a processor, configured to perform a hash table indexing, based on the signature table index, wherein the signature table index is an index to an address of signature table;

wherein the processor performs a fast pattern match, wherein the signature table contains signature fields, and in response to any second signature field in the signature table is matched with the key digest, an action table index of the same signature field is then assigned to an address index to an action table; and wherein the processor performs an action to the packet, wherein the action is listed in the action table.

9. The system for packet processing according to an access control list table according to claim 8, wherein the ACL codeword table and the mask table is stored in a memory.

10. The system for packet processing according to an access control list table according to claim 8, wherein the action includes forwarding action, virtual local area network (VLAN) tagging operation, differentiated services code point/type of service (DSCP/ToS) modification action, or statistics or metering action.

11. The system for packet processing according to an access control list table according to claim 8, wherein the ACL codeword table includes a mask table index, a cascade field and a last field.

12. The system for packet processing according to an access control list table according to claim 8, wherein performing the hash function to obtain the hash value is performed based on a cyclic redundancy check (CRC) algorithm or any hash algorithm.

13. The system for packet processing according to an access control list table according to claim 8, wherein a hash value comparison is performed the hash table index and the key digest.

14. The system for packet processing according to an access control list table according to claim 8, wherein the signature table index is an index to the signature table and uses the key digest to match the second signature field.

* * * * *